(12) United States Patent
Elbe et al.

(10) Patent No.: US 6,965,910 B2
(45) Date of Patent: Nov. 15, 2005

(54) CALCULATING UNIT AND METHOD FOR ADDING

(75) Inventors: Astrid Elbe, Munich (DE); Norbert Janssen, Munich (DE); Holger Sedlak, Lochhofen (DE); Jean-Pierre Seifert, Munich (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 10/959,907

(22) Filed: Oct. 6, 2004

(65) Prior Publication Data

US 2005/0097157 A1   May 5, 2005

Related U.S. Application Data

(63) Continuation of application No. PCT/EP03/03402, filed on Apr. 1, 2003.

(30) Foreign Application Priority Data

Apr. 10, 2002  (DE) ............................... 102 15 785

(51) Int. Cl.[7] ................................................ G06F 7/50
(52) U.S. Cl. ...................................... 708/706; 708/712
(58) Field of Search ............................... 708/706, 712

(56) References Cited

U.S. PATENT DOCUMENTS

| | | | |
|---|---|---|---|
| 4,691,124 A | | 9/1987 | Ledzius |
| 4,764,887 A | * | 8/1988 | Lai et al. .................... 708/711 |
| 4,870,681 A | | 9/1989 | Sedlak |
| 4,905,180 A | * | 2/1990 | Kumar ........................ 708/712 |
| 4,942,549 A | * | 7/1990 | Jutand et al. ................ 708/706 |
| 5,337,269 A | * | 8/1994 | McMahan et al. ........... 708/711 |
| 5,912,833 A | | 6/1999 | Jang |
| 6,199,091 B1 | * | 3/2001 | Kobayashi et al. ......... 708/706 |
| 6,735,612 B1 | * | 5/2004 | Kobayashi et al. ......... 708/706 |
| 6,742,014 B2 | * | 5/2004 | Bradley ....................... 708/712 |
| 2002/0091744 A1 | * | 7/2002 | Kantabutra et al. ......... 708/712 |

FOREIGN PATENT DOCUMENTS

| | | |
|---|---|---|
| DE | 35 40 800 A1 | 8/1987 |
| DE | 36 31 992 A1 | 11/1987 |
| EP | 0 295 409 A2 | 12/1988 |

* cited by examiner

*Primary Examiner*—Tan V. Mai
(74) *Attorney, Agent, or Firm*—Darby & Darby

(57) ABSTRACT

A calculating unit comprises several adder blocks with single adders, a clock generator and control means. A carry pass means is associated with each adder block, which determines whether a carry passes fully through the respective adder block. If it is determined that the carry does not pass through any of the adder blocks, the calculating unit is clocked with a clock period, which is sufficient that the carry passes almost fully through an adder block, and passes through at least part of the upstream adder block. If it is determined, that the carry passes fully through an adder block, a panic signal is generated. The adder block is decelerated, so that the clock period is high enough that the carry additionally fully passes through another adder block. Only in a case of panic signals of two adjacent adder blocks, is the calculating unit is decreased so much, that the carry passes from the least significant digit of the calculating unit to the most significant digit of the calculating unit.

14 Claims, 1 Drawing Sheet

CALCULATING UNIT AND METHOD FOR ADDING

CROSS REFERENCE TO RELATED APPLICATION

This application is a continuation of co-pending International Application No. PCT/EP03/03402, filed Apr. 1, 2003, which designated the United States and was not published in English and is incorporated herein by reference in its entirety.

BACKGROUND OF THE INVENTION

1. Field of the Invention

The present invention refers to calculating units and particularly to long-number calculating units for cryptographical tasks.

2. Description of the Related Art

DE 3631992 C2 discloses a cryptography processor for efficient execution of the public key method of Rivest, Shamir and Adleman, which is also known as RSA method. The modular exponentiation needed in this method is calculated by using a multiplication look-ahead method and a reduction look-ahead method. Therefore, a three-operand adder is used. The disclosed three-operand adder has a length of 660 bits. An elementary cell consists of several cryptoregisters, a shifter, a half adder, a full adder and a carry-look-ahead element. Four such elementary cells form a four-cell block, wherein a carry-look-ahead element is associated to the four-cell block. Five such four-cell blocks form a 20-cell block. The encryption unit consists overall of 33 such 20-cell blocks and a control unit, which comprises a clock generator for clocking the elementary cells. The carry-look-ahead elements of the four-cell blocks are connected together in order to realize whether a carry propagates over a bigger distance, namely 20 bits. When a propagate signal of the 20-bit block is active, this means that the carry of the considered 20-bit blocks depends on a carry at the output of the previous block. However, when the propagate signal of a 20-bit block is not active, this means that a possibly present carry at the output of this block, i.e. at the most significant bit of this block has been generated within this block, but is not influenced by the previous block.

Thus, it is possible to make the clock of the calculating unit, i.e. the rate with which the new input operands are fed in, faster than the worst case, where the carry path extends from the least significant bit of the whole calculating unit to the most significant bit of the whole calculating unit. If a propagate signal is activated for a 20-bit block, the clock of the whole calculating unit is decelerated such that the worst case is considered, i.e. the calculating unit is stopped until a carry from the least significant bit of the whole calculating unit has propagated to the most significant bit of the whole calculating unit.

The cycle time, i.e. the time after which the next input operands are fed into the calculating unit, is thus set such that it is just sufficient to process the carry of directly adjacent blocks. This has the advantage that independent of the number of digits or elementary cells of the calculating unit only the time of a block carry has to be considered. If, however, a determination is made that the carry of the current block is not only affected by the previous block but also by the block preceding the previous block, the cycle time is made so slow that there is enough time for a complete carry path.

The described concept is advantageous in that no longer the length of the calculating unit determines the velocity, but that the velocity corresponds to the length of a block, i.e. to the length of the carry path to be expected, which depends on the length of a block.

The described method is disadvantageous in that, when it is determined that a carry propagates over a longer distance than one block, i.e. when a so-called panic signal is generated, the calculating unit is stopped as a whole, in order to consider the worst case. If, therefore, the length of a block is chosen short, which is as such desirable, since the clock period can be increased (the cycle time can be decelerated), no significant velocity gain will occur, since panic signals occur more often, so that the calculating unit as a whole is slowed down by the constant panic case.

If, however, the length of a block is chosen relatively long to decrease the number of panic cases and almost eliminate it, respectively, the cycle time has to be increased as well, since it has to be so high that maximally the case (the normal worst case) is considered, where a carry is generated in the second least significant bit of the previous block, passes through the rest of the previous block and further passes almost fully through the current block, if, for example, a kill parameter can be found in the most significant bit of the current block.

Thus, a short block length leads to a higher clock rate, but, however, leads all in all to a reduced performance of the calculating unit due to the heavily increasing number of panic cases. A long cycle time, i.e. a low clock rate, leads, however, to a decreasing number of panic cases, is, however, not desirable in that only a limited number of addition processes can be performed rate in a certain time due to the low clock.

SUMMARY OF THE INVENTION

It is an object of the present invention to provide a faster adder concept.

In accordance with a first aspect, the present invention provides a calculating unit, having: a first adder block with a first plurality of single adders and a pass determinator for determining, whether a carry passes fully through the first adder block; a second adder block downstream of the first adder block with a second plurality of single adders and a second pass determinator for determining, whether a carry passes fully through the second adder block; a third adder block downstream of the second adder block with a third plurality of single adders and a third pass determinator for determining, whether a carry passes fully through the third adder block; a clock generator for generating a clock, with which the first, the second and the third adder blocks are fed with input values to be added, wherein in the case where the first, the second and the third pass determinators determine that no carry passes fully through an adder block, the clock has a clock period, which is at least so high that a carry can pass almost fully through an adder block, and can pass through at least part of one previous adder block; and a controller for controlling the clock generator, so that in the case, where the first, the second or the third pass determinators determine that a carry passes fully through a respective adder block, the clock has a clock period which is sufficient that a carry can pass fully through the respective adder block, can pass almost fully through the adder block downstream of the respective adder block and can pass at least part of an adder block upstream of the respective adder block, and which is lesser than the time, which is necessary for a carry to pass through all adder blocks; and that in the case where the first, the second or the third pass determinators determine that a carry passes fully through two adjacent adder blocks, the clock has a clock period, which is at least so high that a carry can fully pass through the two adjacent adder blocks, can pass almost fully through an adder block following the adjacent adder blocks, and can pass at least through part of the adder block upstream of the adjacent adder blocks.

In accordance with a second aspect, the present invention provides a method for adding using a first adder block with a first plurality of single adders, a second adder block downstream of the first adder block with a second plurality of single adders and a third adder block downstream of the second adder block with a third plurality of single adders, with the steps of: determining, whether a carry fully passes through the first, the second or the third adder block; and if a carry does not fully pass through any adder block, feeding the calculating unit with input operands with a clock, which has a clock period that is at least so high that a carry can merely fully pass through one adder block and can pass at least through a part of a previous adder block; if it is determined that a carry passes fully through an adder block, feeding the calculating unit with input values to be added with a clock, which has a clock period, which is sufficient that a carry can pass fully through the respective adder block, can almost fully pass through the adder block downstream the respective adder block, and can pass through at least part of the adder block upstream of the respective adder block, and which is lesser than the time, which is needed that a carry can pass through all adder blocks; and if it is determined, that a carry fully passes through two adjacent adder blocks, feeding the calculating unit with input values with a clock, which has a clock period, which is so high that a carry can fully pass through the two adjacent blocks, can almost fully pass through an adder block downstream of the adjacent blocks, and can pass at least through a part of the adder block upstream of the adjacent blocks.

The present invention is based on the knowledge that the total performance of a calculating unit can be improved by using a two or multistage panic hierarchy. This makes it possible to use shorter blocks, which results immediately in a shorter cycle time, i.e. a higher clock rate. If a block outputs a panic signal, this is, however, not used to consider the absolute worst case. The calculating unit is merely clocked a bit slower, in fact so slow that the carry can propagate across the block, which initiated the panic signal, almost (minus one elementary cell) the whole next block, i.e. the block towards higher-order bits, and through the elementary cell of the previous block minus one elementary cell. Thus, the calculating unit will be decreased only a little bit compared to its original clock rate and not stopped completely to consider the worst case. In the case of a two-stage panic hierarchy, the calculating unit is only decelerated for the worst case when two adjacent blocks output a panic signal, i.e. when a double-panic case is present. Only in this case, the calculating unit will be fully decelerated to the worst case.

In the case of a three-stage panic hierarchy, the calculating unit would not be stopped fully in the case of a panic in two adjacent blocks, but only again clocked so slow that the carry can propagate across four blocks minus two elementary cells. Only in the case where three subsequent blocks output a panic signal, the calculating unit will be stopped for so long that the carry can propagate from the least significant bit of the calculating unit to the most significant bit of the calculating unit.

In a preferred embodiment of the present invention, one carry bypass is provided per block. In this case, the actually unfavorable panic cases, where a carry passes fully through a block, be utilized advantageously, namely in that the carry of the previous block is placed straight away on the carry bypass, where the carry propagates significantly faster than when rippling through the block in the case of a ripple adder. Therefore, in a panic event, the calculating unit has to be decelerated only weakly, since the carry for the block, which has initiated the panic event, is placed on the carry bypass.

Even in the case where two adjacent blocks initiate a panic signal, a carry bypass is still advantageous, since also the time, by which the calculating unit is decelerated for the worst case, is shorter than in the case where no carry bypass is present. Particularly, the worst case time can be shortened by the difference time span that a carry needs for passing through the two panic blocks, wherein, however, the relatively short time that the carry needs to pass through the carry bypass still has to be considered.

Further, it is also preferred to provide sub-blocks within a block, to which carry bypasses are associated, in order to use such a sub-block carry bypass in the case where only propagate signals are present in one sub-block.

The inventive multistage panic concept can either be utilized to reduce the cycle time so strongly that a panic case occurs in fact often, but does not lead to a significant velocity reduction, and a double-panic case occurs rarely, which leads to a significant slowdown of the calculating unit, or it can be utilized for the fact that a panic case occurs relatively rarely and a double-panic case almost never.

According to the invention, a block length between 8 and 16 bits is preferred.

BRIEF DESCRIPTION OF THE DRAWINGS

These and other objects and features of the present invention will become clear from the following description taken in conjunction with the accompanying drawing, in which.

DESCRIPTION OF THE PREFERRED EMBODIMENTS

Figure 1:
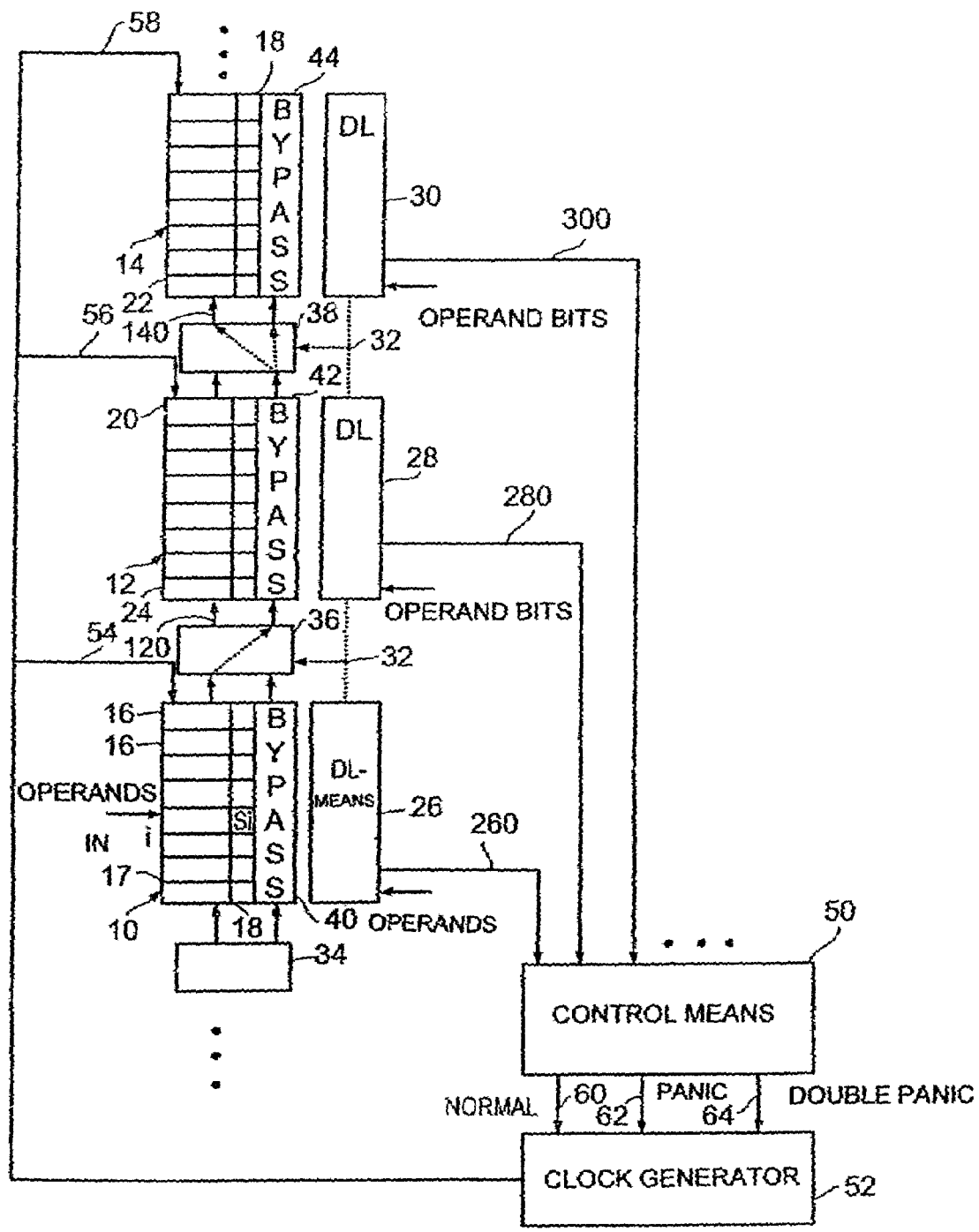
FIG. 1 is a block diagram of the inventive calculating unit.

FIG. 1 shows an inventive calculating unit with a first adder block 10, a second adder block 12 and a third adder block 14. The three adder blocks 10, 12, 14 are typically adder blocks of a calculating unit with a significantly higher number of adder blocks, such as 64 for a calculating unit with a total length of 1024 bits, wherein one block comprises 16 elementary cells, or 128 for a calculating unit with 2048 bits, when one adder block has a length of 16 bits. Such calculating unit lengths are necessary in order to be able to carry out the RSA method with respective key lengths of 1024 or 2048 bits. In the elliptic curve cryptography, a respective security can be obtained with significantly lower key lengths, such as 160 bits, wherein here 10 adder blocks with 16 bits each are sufficient.

Each adder block 10, 12, 14 consists of a number of elementary cells 16, which are typically identical. Each elementary cell, as it is also the case in the prior art, comprises registers for storing 2, 3 or more operands, a shifter and an adder, and comprises typically also an output register for storing a sum bit of the operation $S_i$, as is shown in FIG. 1 at 18. The adder within an elementary cell can be a one-bit full adder, as needed, i.e. an adder which receives two bits as well as a carry of a low order elementary cell as input quantities, and which outputs a sum bit $S_i$ as well as a carry for the higher order adjacent elementary cell as output quantities. Alternatively, the adder within an elementary cell can also be a combination of a half adder and a full adder, to carry out a three-operand operation for summing three different operands. All used adders within an elementary cell have the propriety that they provide a carry bit to the next higher elementary cell, that they provide a sum bit $S_i$ and that they receive a carry of a next lower elementary cell.

As it is shown in FIG. 1, the adder blocks 10, 12, 14 are interconnected such that always the most significant elementary cell, such as the elementary cell 20 of the second adder block 12 is connected to the least significant elementary cell 22 of the third adder block 14. Correspondingly, the least significant elementary cell 24 is connected to the most significant elementary cell 16 of the first adder block 10.

Each adder block further comprises carry pass means 26, 28 and 30, respectively, which receives the operand bits of the one-bit full adder within an elementary cell as input signal, and which supplies a panic signal 260, 280, 300 on the output side.

As will be explained below, each pass means further provides a control signal 32 to cause a respective carry control means 34, 36, 38 to put a carry on a carry bypass 40, 42 or 44 and not to take a carry from a next lower block from the most significant elementary cell of this block, respectively, but from the carry bypass of this block when a carry has been put on the carry bypass.

Further, the inventive calculating unit comprises control means 50 as well as a clock generator 52, which controls the clock and the clock period, respectively, by which new input operands are fed into the elementary cells of the adder blocks, via clock control lines 54, 56, 58.

The clock generator can run with three different velocities, once with a fast velocity in a normal state 60, alternatively with a medium velocity 62 in the case of a panic and with a slow velocity 64 in the case of a double-panic.

It should be noted that the velocity control of the clock generator could either be performed by actual control of the clock generator, so that it actually clocks slower or faster.

For reasons of a simpler implementability it is, however, preferred to run the actual base clock generator constantly, and not feed in input values to be added into the adder block, i.e. the actual single calculating units, at every clock period, but to insert so-called idle clocks. Inserting idle clocks means that input values to be added are no longer fed in, for example, at every clock of the clock generator, but, for example, only after every third, fourth, fifth, . . . clock of the base clock generator.

In the following, reference will be made to the operation of the calculating unit shown in FIG. 1. First, it is assumed that the normal case exists, i.e. that the calculating unit is clocked by the clock generator 52 with normal velocity 60. The normal case is present when none of the path means 26, 28, 30 determine that a carry passes through a whole adder block 10, 12, and 14. This means, in other words, that in every adder block an elementary cell is present, which absorbs a carry possibly impinging upon it.

Whether an elementary cell absorbs a carry, generates a carry or neither absorbs nor generates a carry but simply passes it on, can be calculated with the so-called carry-look-ahead-parameter kill, generate and propagate. This is known in the art and, for example, described in "Computer Architecture a Qualitative Approach", Hennessy & Patterson, Second Edition, Morgan Kaufman Publishers, Inc., 1996, appendix A.

For a two-operand addition, the carry-look-ahead parameters are calculated as follows:

The kill parameter indicates that a carry, which possibly comes from a lower order elementary cell, is absorbed. The kill parameter is calculated from the OR-operation of the two input operand bits and is active, when the OR-operation of the input operand bits results in a 0. In the case of an active kill parameter, the carry also goes into the sum bit. If the incoming carry equals "1", the sum bit equals "1". If, however, the incoming carry equals "0", the sum bit also equals "0". In any case, an active kill parameter interrupts or breaks the carry path.

The generate parameter is calculated from the AND-operation of the input operands and indicates that this elementary cell will generate a carry. The generate parameter is active, when the AND-operation of the two input operands results in a 1. An active generate parameter also leads to an interruption of the carry path. An incoming carry of "1" "flows" into the sum bit and is absorbed there. In contrary to the kill parameter, a new carry is generated in the generate parameter, which is, of course, not the case with the kill parameter. With regard to the interruption of the carry path, generate and kill behave identically.

The propagate parameter is calculated from the OR-operation of the two input operands for an elementary cell and indicates that a carry would simply pass through an elementary cell. The propagate parameter is active when the OR-operation of the two input bits for the elementary cell equals 1 and the AND-operation of the input bits (generate) does not equal 1.

A preferred implementation of a pass means, such as pass means 28 of the second adder block 12 consists of the fact that all propagate parameters of the elementary cells in the pass means will be ANDed. A panic signal 280 will be output when the pass means determines that a carry passes fully through the second adder block, i.e. that in the second adder block no elementary cell generates an active kill parameter or generate parameter.

In this case, the carry path is longer than an adder block and the calculating unit has to be clocked slower, as will be discussed below.

In the case where no pass means generates a panic signal, it is, however, ensured that the carry path is shorter than at a block, so that the calculating unit can be operated with the fast normal velocity 60. In a clock according to the normal velocity 60, a block, such as the second adder block 12, has to be able to output its sum bits Si. Sum bits can only be output when the carries of the next lower elementary cells are present. When no pass means has generated an active panic signal, and after particularly the pass means 26 has generated no panic signal, it is ensured that in the worst case the input carry 120 is generated in the second lowest elementary cell 17 of the first adder block and then—in the worst case—passes through the whole first adder block, enters the second adder block 12 as carry and—in the worst case—is only absorbed in the most significant single adder 20 of the second adder block. Thus, the clock in the normal case must therefore only be so fast that the carry from the second lowest digit 17 of the first adder block can propagate through the whole first adder block and to the most significant single adder of the second adder block in order to be able to determine the sum bits for the first and the second adder block.

Thus, the processing with regard to the second adder block takes place in two phases. First, the input carry 120 is determined. As soon as the input carry 120 is known, the sum bits of the second adder block 12 are output in a second phase. A similar procedure is carried out in parallel with all other blocks, so that in the normal case, i.e. when no panic signal 260, 280, 300 is active, it can be clocked with a clock whose clock period is so high that a carry can pass through at least part of the previous block, namely in the worst case, all elementary cells of the previous blocks minus one elementary cell, and can further pass through the whole current block minus an elementary cell. In a possible implementation, typically, the limit is not immediately desired, but a security factor in the range of 5 to 10% towards a higher clock period, with which the input values to be added are fed in, is preferred.

In the following, reference will be made to the case where a pass means, such as pass means 28, generates a panic signal 280. This means that the input carry 140 in the third adder block 14 is not determined by the second adder block 12 but by the first adder block 10. In this panic case, the normal velocity of the clock generator would lead to errors. Thus, the clock generator 52 is controlled by the control means 50 to a panic velocity 62, which is a bit slower than in the normal case. Particularly, the clock velocity, with which the operands are fed in, is set such that a carry, which is generated in the second lowest elementary cell 17 of the first adder block in the worst case can propagate through the second adder block 12, since the input carry 140 is present in the second adder block 14 only then. Further, the panic clock has to be so slow that when the carry 140 is present, the carry can pass through the second adder block 14 up to the last elementary cell (in the worst case). In the panic case, the clock will therefore be so slow that the carry can pass through all elementary cells minus one elementary cell of the first adder block, that the carry can pass through the second adder block and that the carry can further pass almost fully through the third adder block 14. In preferred cases, this value is not used directly, but typically, a security factor in the range of 5 to 10% is added to the theoretically maximum panic clock period as well.

It is preferred to provide each adder block with a carry bypass. Thereby, the clock period can be decelerated in the panic case. After the second pass means 28 has already determined that the carry propagates fully through the second adder block 12, i.e. is not influenced by the second adder block 12, the carry at the output of the first adder block is put on the carry bypass 42 of the second adder block by the carry control means 36, and from there fed into the least significant digit by the carry control means 38, as it is illustrated in blocks 36 and 38 with dotted lines. In this case, the panic clock period has to be longer in comparison to the normal case only about that time that the carry needs to propagate across the carry bypass 42 of the second adder block. This time is typically much shorter than when a full carry ripple has to be awaited by an adder block, so that the clock period in the panic case is not much longer than in the normal case.

If, however, the control means 50 determines that two adjacent pass means, such as the pass means 28 and the pass means 30 have determined that a carry passes through both blocks, the case of a double-panic is given. In this case, the carry of the next higher adder block, which is not shown in FIG. 1, is determined by the elementary cells of the first adder block 10 in the worst case of the lowest elementary cell 17 of the first adder block 10. In this case, if the clock is not reduced, an error will occur, since the next operands would already be fed into the calculating unit before the higher adder block (not shown in FIG. 1) downstream of the second adder block 14 has finished outputting the sum bits.

According to the invention the calculating unit will be decelerated in the illustrated embodiment, as if a carry propagates from the least significant digit of the whole calculating unit to the most significant digit of the whole calculating unit. To shorten that time, the carry bypass 42 and the carry bypass 44 are used. Since the two blocks 12 and 14 do not influence the carry, the carry is put on the carry bypass 42 by block 36, and not fed into the second adder block 14 by a block 38, as in the previously described case, but directly directed to the carry bypass 44 of the third adder block. The total duration a carry needs from the least significant digit of the calculating unit to the most significant digit of the calculating unit is thus at least shortened by using the two carry bypasses 42 and 44.

It can be seen that a double-panic case leads to a very significant slowing down of the calculating unit. To make this total-stop case even scarcer, a third panic level can be introduced, which consists of three adjacent pass means, such as pass means 26, 28, 30, which determine that a carry passes fully through their respective adder blocks. If a triple panic means is present, the calculating unit does not have to be slowed down to the overall worst case in the case of a double-panic, but has to, in analogy to the simple panic, be slowed down only so strongly that the carry can pass almost fully through at least part of the first adder block (namely, in the worst case, all bits minus one bit), the two carry bypasses 42 and 44 as well as the next higher block, which is not shown in FIG. 1. Thus, if a triple panic means is present, the clock period in the case of double-panic differs merely from the clock period in the case of simple panic in that the time that a carry needs to pass through the carry bypass 44 is longer.

An arbitrary number of panic stages can be used, wherein the benefit through another panic stage diminishes more and more compared to the additional circuit effort to determine the higher panic case. On the other hand, the number of elementary cells in an adder block can be reduced further with every higher panic stage, which immediately leads to the fact that the normal clock 60 can be increased further and further.

It should be noted that the adder blocks could internally have an arbitrary combination of calculating units. The most simple case is that each adder block is arranged as simple ripple carry adder, which, additionally to a simple ripple carry adder should generate the propagate signal per elementary cell, so that the pass means can operate on the basis of the propagate signals.

If all adder blocks are fully organized as ripple carry adder, the clock period in the normal case has to be at least so long that a carry can ripple through all elementary cells of an adder block minus one elementary cell and through all elementary cells of a downstream adder block.

However, this time can be reduced by the fact that an adder block is fully organized as carry-look-ahead adder. In this case, the carry input bit is in the second adder block 12, i.e. the carry bit 120 is present much faster.

Carry-look-ahead adders work very fast, but need significantly more chip area. For that reason, a tradeoff is possible in that smaller carry-look-ahead adder sub-blocks are formed, which are interconnected according to a ripple-carry adder, to generate an adder block 10, 12 or 14. The actual adder layout within the block will be dictated by practical conditions. In this case it is preferred to insert a carry bypass also for a sub block. If a block has, for example, sixteen elementary cells and four sub blocks are formed, a carry bypass can be activated for a sub block, when all elementary cells of the sub block have an active parameter.

As it has already been discussed, the inventive calculating unit is particularly useful for cryptographic processors, since they typically need long-number calculating units of a length in a range of 160 bits for elliptic curve cryptography applications or with a length in the order of 1024 or 2048 bits for RSA calculations. This is in significant contrast to typical 8, 16, 32 or 64 bit CPUs, as can be found in general purpose processors. With regard to the number of elementary cells in an adder block, a number between 8 and 16 elementary cells and particularly a number of 16 elementary cells for the case of a two-stage panic hierarchy is preferred. If a third panic hierarchy is provided, it is preferred to reduce the number of elementary cells in a block to, for example, 8, which corresponds immediately to a normal clock velocity double that amount. By providing carry bypasses, the panic velocity (in the case of a two-stage panic hierarchy) and/or the double-panic velocity (in the case of a three-stage panic hierarchy) is kept almost the amount as in the case of the normal velocity, since a carry typically passes through a carry bypass much faster than through the adder block itself.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. A calculating unit, comprising:
   a first adder block with a first plurality of single adders and a pass determinator for determining, whether a carry passes fully through the first adder block;
   a second adder block downstream of the first adder block with a second plurality of single adders and a second pass determinator for determining, whether a carry passes fully through the second adder block;
   a third adder block downstream of the second adder block with a third plurality of single adders and a third pass determinator for determining, whether a carry passes fully through the third adder block;
   a clock generator for generating a clock, with which the first, the second and the third adder blocks are fed with input values to be added, wherein in a case where the first, the second and the third pass determinators determine that a carry does not pass fully through any of the adder blocks, the clock has a clock period, which is at least high enough that the carry passes almost fully through one of the adder blocks, and passes through at least part of the upstream adder block; and
   a controller for controlling the clock generator, so that in a case, where the first, the second or the third pass determinators determine that a carry passes fully through a respective adder block, the clock has a clock period which is sufficient that the carry passes fully through the respective adder block, passes almost fully through the adder block downstream of the respective adder block and passes through at least part of the adder block upstream of the respective adder block, and which is less than the time, which is necessary for the carry to pass through all of the adder blocks; and
   in a case where the first, the second or the third pass determinators determine that a carry passes fully through two adjacent adder blocks, the clock has a clock period, which is at least high enough that the carry fully passes through the two adjacent adder blocks, passes almost fully through the adder block downstream the adjacent adder blocks, and passes at least through part of the adder block upstream of the adjacent adder blocks.

2. The calculating unit according to claim 1, wherein the at least part of the upstream adder block to be almost fully passed is the number of single adders of the upstream adder block minus one single adder.

3. The calculating unit according to claim 1, wherein a time, which is necessary to pass almost fully through one adder block, is equal to a time to pass through all single adders minus one single adder of the one adder block.

4. The calculating unit according to claim 3, wherein, within an adder block, sub-blocks of single adders are present, wherein in a case where all single adders of one of the sub-blocks provide a propagate signal, a sub-block carry bypass for the respective sub-block is activatable to shorten a time the carry needs to pass through the sub-block, in comparison to a case where no carry bypass is present for the sub-block.

5. The calculating unit according to claim 1, wherein the first, second or third pass determinator operates by using a carry look-ahead parameter.

6. The calculating unit according to claim 1, wherein an adder block carry bypass is associated with one of the adder blocks, wherein in a case where one of the pass determinators determines that a carry passes fully through the respective adder block, the adder block carry bypass is activated, and
   wherein the controller is formed to control the clock generator such that a time, which is set for a full pass through the adder block, is equal to a time the carry needs to pass through the adder block carry bypass.

7. The calculating unit according to claim 6, wherein an adder block carry bypass is associated with each adder block, and which is activated when the respective pass determinator determines that the carry passes through the respective adder block.

8. The calculating unit according to claim 1, wherein in a case where it is determined that in at least two adjacent adder blocks a carry passes through both adder blocks, a controller is formed to make the clock period long enough that the carry passes through the whole calculating unit.

9. The calculating unit according to claim 1, wherein the controller is formed to make the clock period long enough that a carry passes through the whole calculating unit, only in a case where the pass determinator of three adjacent adder blocks determines that the carry fully passes through the respective adder blocks.

10. The calculating unit according to claim 1, wherein the first, the second and the third pluralities of single adders are each larger or equal to 8 and smaller or equal to 16.

11. The calculating unit according to claim 1, wherein each of the adder blocks comprises a plurality of sub-blocks, wherein the sub-blocks are each formed as carry-look-ahead adders for a plurality of bits, and wherein the plurality of sub-blocks are connected to form a ripple carry adder.

12. The calculating unit according to claim 1,
wherein the clock generator is formed to generate a base clock with a fixed clock frequency, and
wherein the controller is formed to control the clock generator such that in a case of an increase of the clock period with which the input values to be added are fed, a variable number of idle base clock cycles are fed in between two base clock cycles, where input values to be added are fed.

13. The calculating unit according to claim 1,
formed as a long-number calculating unit and comprising more than 150 single adders.

14. A method for adding using a first adder block with a first plurality of single adders, a second adder block downstream of the first adder block with a second plurality of single adders and a third adder block downstream of the second adder block with a third plurality of single adders, comprising the steps of:

determining, whether a carry fully passes through the first, the second or the third adder block; and if it is determined that the carry does not fully pass through any of the adder blocks, feeding the calculating unit with input operands with a clock, which has a clock period that is at least high enough that the carry merely fully passes through one of the adder blocks and passes at least through a part of the upstream adder block;

if it is determined that the carry passes fully through one of the adder blocks, feeding the calculating unit with input values to be added with a clock, which has a clock period, which is sufficient that the carry passes fully through the respective adder block, almost fully passes through the adder block downstream from the respective adder block, and passes through at least part of the adder block upstream of the respective adder block, and which is less than the time, which is needed for the carry to pass through all of the adder blocks; and if it is determined, that the carry fully passes through two adjacent adder blocks of the adder blocks, feeding the calculating unit with input values with a clock, which has a clock period, which is high enough that the carry fully passes through the two adjacent blocks, almost fully passes through the adder block downstream of the adjacent blocks, and passes at least through a part of the adder block upstream of the adjacent blocks.

* * * * *